Patented July 6, 1948

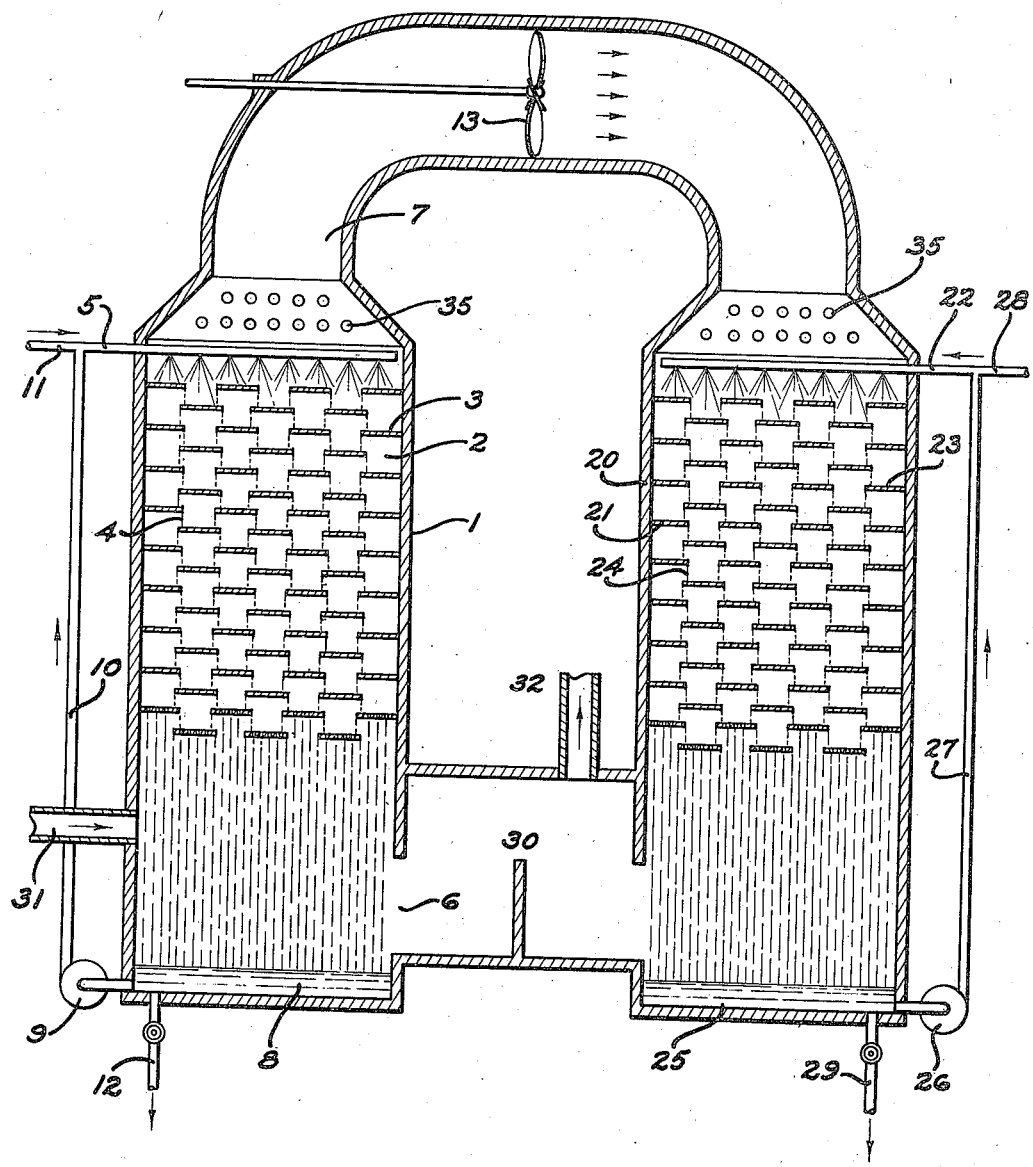

2,444,527

UNITED STATES PATENT OFFICE 2,444,527

METHOD FOR RECOVERING ORGANIC ACIDS FROM SOUR SEWAGE SLUDGE

Richard D. Pomeroy, Altadena, Calif.

Application November 30, 1943, Serial No. 512,392

3 Claims. (Cl. 260—412.5)

My invention relates to the recovery of organic acids from sour sewage.

It is well known that sour sewage sludge contains fatty and other organic acids, but it is also well known that the proportion of said acids to the total volume of sludge is relatively low. These acids can, of course, be recovered by distillation, but the volume of sludge that must be treated per pound of acids recovered is so large that the cost of ordinary distillation per pound of acids recovered makes the use of conventional distillation impractical. It is an object of my invention to provide a process of distillation by which organic acids can be economically recovered from sour acid sludge.

Sour acid sludge contains not only acetic, propionic, and butyric acids in substantially equal proportions, but it also contains oleic, stearic, and other organic acids all of which have substantial commercial value and all of which may be recovered by my process. Each of the organic acids has its own characteristic boiling point. Their boiling points are, however, lowered by a reduction of the pressure at which vaporization takes place, and it is possible to extract organic acids from the sludge as vapors by heating the sludge to a temperature somewhat below 212° F. if the vaporization is carried on in a partial vacuum, but my investigations seem to prove that conventional vacuum extraction is too expensive to be practical in recovering acids from sour sewage sludge.

It is, however, possible, utilizing the law of partial pressures, to obtain much the same results as are obtained by conventional vacuum extraction by vaporizing the acids in a space containing a diluent gas or vapor, the mixed gases or vapors being at or near atmospheric pressure, and it is an object of my invention to provide a process of extracting and recovering organic acids from sour sewage sludge in which the operations are carried on at or near atmospheric pressures, but in which the acids are caused to vaporize at temperatures much below their atmospheric boiling point by the presence of diluent gas or vapor, and in my process I have found that steam is an excellent diluent.

In ordinary distillation in which steam is so used, it is usual to recover the desired product by fractional condensation of the mixture of steam and product vapors, but the cost of such fractional condensation is too high to make its use practical for my purpose, and it is a further object of my invention to separate the organic acids from the steam by other more economical means.

Further objects and advantages will be made evident hereinafter.

To permit the process to be readily understood, I annex hereto a drawing, which is merely schematic.

Referring to the drawing, I provide a container 1 enclosing a vaporizing space 2. The vaporizing space 2 has baffles 3 so placed therein that raw material which is delivered to the top of the vaporizing space 2 and which falls therethrough is broken up into thin films, streams, or drops 4, the purpose of the baffles 3 being to finely subdivide the raw material, which is delivered through a pipe 5, in its passage through the vaporizing space 2. Steam, admitted to the vaporizing space through an opening 6 in the wall thereof, rises through the space and passes out of the space through an opening 7. Spent material, after falling through the space, collects in the bottom of the vaporizing space, as shown at 8, and may be withdrawn by a pump 9 and circulated through a pipe 10 back to the top of the container, raw material being ordinarily continuously supplied to the process through a pipe 11 and spent material being withdrawn through a pipe 12. Practically, I prefer to maintain this circulation of material through the vaporizing space with a continuous introduction of new raw material through the pipe 11 and a continuous withdrawal of spent material through the pipe 12, although the process may be very conveniently operated as a batch process.

Soured sewage sludge contains various organic acids, and these acids vaporize when heated. This vaporization is promoted by the presence of steam, which fills the vaporizing space 2, the vaporization then taking place according to the law of partial pressures, so that with the space 2 entirely filled with steam vaporization occurs readily as long as the concentration of said vapors in the steam is kept low. By continuously withdrawing steam from the vaporizing space and supplying fresh steam which is free from such vapors, I am able to obtain a distillation of these vapors in very low concentrations in the steam. The steam is preferably circulated by some mechanical means, such as a fan 13, passing into the top of a reaction chamber 20 which contains a reaction space 21. The steam passes downwardly through the reaction space in intimate contact with a reagent which passes into the reaction space through a pipe 22 and is broken up by baffles 23. The purpose of the baffles is to break up the reagent into films, streams, or drops 24 so that the steam will be able to intimately contact all portions of the reagent. The reagent collects in a pool 25 in the bottom of the reaction space and is preferably pumped by means of a pump 26 through a pipe 27 back into the reaction space. Fresh reagent is delivered through a pipe 28, and used reagent is withdrawn from the pool 25 through a pipe 29.

In soured acid sludge, the vaporizable substances which it is desired to recover are acidic, and in practical operation these substances are largely acetic, propionic, and butyric acid. Vapors of these acids are formed in the chamber 2 and are carried over with the steam into the reaction space 21, in which they come in contact with the reagent. When treating to recover such acidic agents, I use an alkaline reagent, preferably an aqueous solution of an alkali or caustic alkali, such as potassium or sodium hydroxide, or calcium hydroxide, or the corresponding carbonate. In any operation of the process, the reagent used must be one that converts the vapors of the substances to be recovered into compounds which will not vaporize at the temperature prevailing in the reaction space, so that the vapors go down as solids or in solution into the pool 25.

The reagent withdrawn from the pipe 29 contains salts or other compounds of these organic acids as suspensions or solutions, and the acids or compounds of the acids may be recovered from the suspensions or solutions in which they are carried by any well known means. The steam, after passing downwardly through the reaction space 21, passes through a baffle space 30 and back through the opening 6 into the vaporizing space. The purpose of the baffle space is to allow any drops of reagent which may be carried in the steam to settle and run back to the pool 25. Economy of steam will be secured if temperature conditions within the apparatus are maintained such that there is little or no condensation of the steam. This steam may be supplied from a suitable boiler through a pipe 31, and steam may be withdrawn from the system through a pipe 32, if desired.

The raw material entering the vaporizing space 2 through the pipe 11 may be heated before being delivered to that space, and the reagent delivered through the pipe 28 to the reaction space 21 may also be heated prior to being delivered to the pipe 28. As a practical matter, I find that in a continuous process, after the process gets in full operation, the raw material and reagent may be readily kept at steam temperatures if the steam is superheated while in the apparatus. For this purpose, I provide pipes 35 which extend across the steam path as it leaves the vaporizing space 2 and across the steam path as it enters the reaction space. Sufficient heat is supplied from the pipes 35 to the vapors and steam passing therethrough to supply all the heat necessary to heat the material and replace any heat losses by radiation or heat carried away by the material in the pipe 12 and the pipe 29. It will be readily recognized by a man skilled in the art that the apparatus illustrated in the drawing may be considerably modified to suit special conditions, and the drawing does no more than to give the man skilled in the art sufficient information to design and construct the necessary apparatus. It is, of course, obvious that in handling large quantities of soured sewage sludge or other raw material, it may be desirable to use a plurality of both vaporizing and reaction chambers.

The process has a special utility when applied to the treatment of soured sewage sludge, ground garbage, or other organic waste, and the character of the organic acids which are recovered depends in a large measure on the nature of the material treated.

The action that takes place in the reaction chamber 21 is a chemical reactions, and not merely a fractional condensation. The prevailing temperature in the reaction chamber 21 is higher than the temperature in the vaporizing chamber 2, since the mixture of steam and acid vapors is heated by the pipes 35 after it leaves the vaporizing chamber, and the pressure in the reaction chamber is only slightly higher than the pressure in the vaporizing chamber 2.

By supplying sufficient heat to the steam-vapor mixture from the pipes 35 or by preheating the materials delivered to the apparatus, or by using both of these expedients, and by recirculating the steam from the reaction chamber 21 to the vaporizing chamber, condensation of the steam may be entirely prevented, so that the cost of steam supply is very small.

I claim as my invention:

1. The process of steam distillation for recovering a volatile fatty acid from non-volatile material containing said volatile fatty acid, which comprises: introducing said material into a vaporizing space; introducing steam into said vaporizing space into contact with said material; maintaining temperature and pressure conditions in said space causing vaporization of said fatty acid into said steam to produce a mixture of said steam and vapors of said volatile fatty acid; removing said mixture from said space and introducing the same into a reaction space; maintaining temperature and pressure conditions in said reaction space preventing substantial condensation of said steam therein; contacting said mixture in said reaction space with an aqueous solution of an alkali reacting with the vapors of said fatty acid to produce a compound which is no-volatile under the temperature and pressure conditions in said reaction space; separating said compound from said steam; returning said steam without substantial condensation to said vaporizing space and supplying sufficient heat to said steam in its circulation through said apparatus to prevent any substantial condensation of the steam in any portion of the process.

2. The process of steam distillation for recovering a volatile organic acid from sewage sludge containing said acid, which comprises: introducing said sludge into a vaporizing space; introducing steam into said vaporizing space into contact with said sludge; maintaining temperature and pressure conditions in said space causing vaporization of said volatile acid into said steam to produce a mixture of said steam and vapors of said volatile acid; removing the resulting mixture from said space and introducing the steam into a reaction space; maintaining temperature and pressure conditions in said reaction space preventing substantial condensation of said steam therein; contacting said mixture in said reaction space with an aqueous solution of an alkaline reagent reacting with the vapors of said volatile acid to produce a compound which is non-volatile under the temperature and pressure conditions in said reaction space; separating said compound from said steam; returning said steam without substantial condensation to said vaporizing space and supplying sufficient heat to said steam in its circulation through said apparatus to prevent any substantial condensation of the steam in any portion of the process.

3. The process of steam distillation for recovering a volatile fatty acid from sewage sludge containing said volatile fatty acid, which comprises: passing said sludge through a vaporizing space; passing steam through said vaporizing space in contact with said sludge; maintaining temperature and pressure conditions in said space causing vaporization of said fatty acid into said steam so as to discharge a mixture of said steam and vapors of said volatile fatty acid from said vaporizing space; introducing the discharged mixture into a reaction space; maintaining temperature and pressure conditions in said reaction space preventing substantial condensation of said vapors of said fatty acid therein; passing through said reaction space in contact with said mixture, an aqueous solution of an alkali reacting with said vapors of said fatty acid to produce a compound which is non-volatile under the temperature and pressure conditions in said reaction space; discharging said compound from said reaction space with said aqueous solution; returning said steam to said vaporizing space; and supplying sufficient heat to said process to maintain said temperatures and prevent substantial condensation of said steam in any portion of said process.

RICHARD D. POMEROY.

REFERENCES CITED

The following references are of record in the file of this patent:

UNITED STATES PATENTS

| Number | Name | Date |
|---|---|---|
| 1,025,622 | Grossman | May 7, 1912 |
| 1,536,312 | Seel | May 5, 1925 |
| 1,624,811 | Suida | Apr. 12, 1927 |
| 1,715,313 | Suida | May 28, 1929 |
| 1,726,401 | Low | Aug. 27, 1929 |
| 1,826,224 | Schultze | Oct. 6, 1931 |
| 1,998,997 | Tolman | Apr. 23, 1935 |

OTHER REFERENCES

Herstein et al., "Chemistry and Technology of Wines and Liquors," page 280, Van Nostrand, N. Y., 1935.